Figure 1:
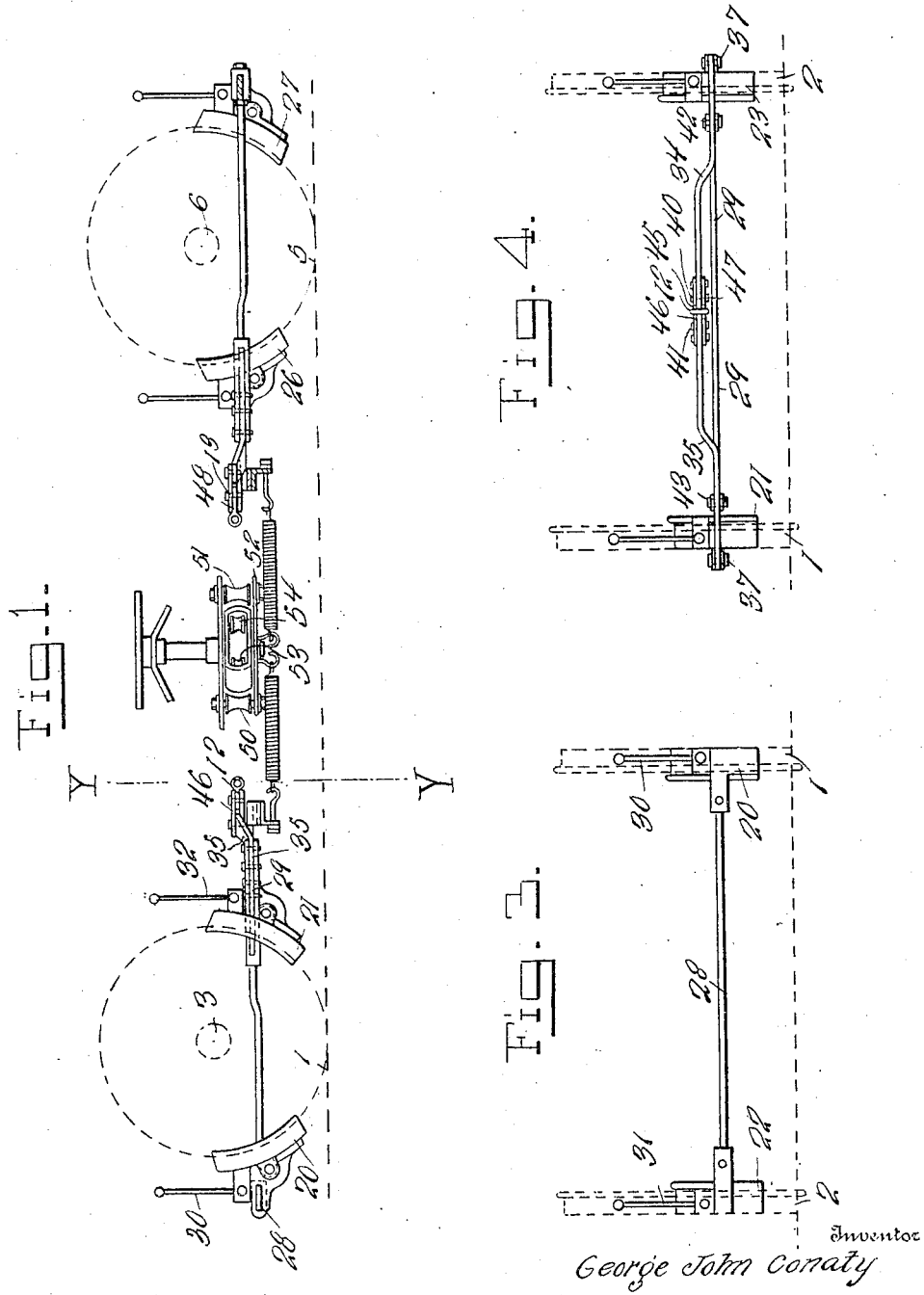

No. 843,262. PATENTED FEB. 5, 1907.
G. J. CONATY.
BRAKE MECHANISM FOR TRAM CARS.
APPLICATION FILED MAY 22, 1906.

2 SHEETS—SHEET 2.

Fig. 2.

Witnesses
G. R. Thomas
W. P. Burke

Inventor
George John Conaty
By Richardson
Attorneys

UNITED STATES PATENT OFFICE.

GEORGE JOHN CONATY, OF KINGS HEATH, COUNTY OF WORCESTER, ENGLAND.

BRAKE MECHANISM FOR TRAM-CARS.

No. 843,262.  Specification of Letters Patent.  Patented Feb. 5, 1907.

Original application filed October 17, 1904, Serial No. 228,820. Divided and this application filed May 22, 1906. Serial No. 318,248.

*To all whom it may concern:*

Be it known that I, GEORGE JOHN CONATY, a subject of His Majesty the King of Great Britain and Ireland, residing at Mayfield House, Taylor Road, Kings Heath, in the county of Worcester, England, have invented new and useful Improvements in Brake Mechanism for Tram-Cars, of which the following is a specification.

This invention relates to brake mechanism for tram-cars having four wheels, and especially to those cars which have their axles capable of movement radial to the track or curve, as described in an application filed by me on October 17, 1904, Serial No. 228,820, of which this case is a division.

The object of the invention is to simplify the construction of the mechanism and to exert equal pressure on all eight brake-blocks of the four wheels at the same time no matter in what positions the wheel-axles may be.

The invention is illustrated in the accompanying drawings, in which—

Figure 1 is a side elevation of the brake mechanism, partly in section on line X X of Fig. 2. Fig. 2 is a plan thereof. Fig. 3 is an end elevation looking toward the left-hand side of Figs. 1 and 2. Fig. 4 is a cross-sectional elevation on line Y Y of Figs. 1 and 2.

One of the axles, which has the two wheels 1 and 2, is marked 3, and the other axle, which has the two wheels 4 5, is marked 6. These wheels and axles are only shown in dotted lines and the axles only appear in Fig. 1. The framework of the truck has not been shown.

For simplicity I will describe one set of the brake mechanism—that is, for the two wheel 1 2 on the axle 3—but it is to be understood that the other set of brake mechanism which is applied to the other two wheels 4 5 on the other axle 6 is similar, and the two sets of brake mechanism are so connected together that the eight brake-blocks 20 21 22 23 24 25 26 27 operate on the four wheels 1 2 4 5 of the car simultaneously. The four brake-blocks 20 21 22 23 are carried by two cross-beams 28 29, which are suspended by universal links 30 31 32 33 from the framework of the truck. The cross-beam 29 nearer to the center of the car carries two levers, (marked, respectively, 34 35,) the outer ends of which turn on fulcrum-pins 36 37, fixed to the cranked end parts 38 39 of the cross-beam 29, the power ends 40 41 of the levers 34 35 pointing in opposite directions toward the center line of the car. Jointed to these levers 34 35 at a short distance from their fulcrum 36 37 are two links, (marked, respectively, 42 43,) which are connected to the beam 28 at the other side of the wheels 1 2. The power ends 40 41 of the two levers 34 35 are connected near the center line of the car by two pairs of links 45 46 to the ends of a balancing-beam 47, the center 12 of which is the center of the radial area in which the two wheels 1 2 and their axle 3 turn. The balancing-beam of the other said brake-gear for the two wheels 4 5 is marked 48, and the center 13 of this balancing-beam is the center of the radial area of the axle 6. The centers 12 13 of the balancing-beams 47 48 are by the chain 49 connected together. This chain 49 passes around rollers 50 51, fixed on the stationary framing 52, and also around the rollers 53 54, which are fixed on the cross-lever 55 at a short distance apart, this lever 55 being mounted on the spindle 56 at the center of the car. From the ends of this cross-lever 55 there are chains 57 58 or other suitable connections leading to the hand-levers or the like, by which the brakes are applied, so that when the cross-lever 55 is turned in the direction of the arrows in Fig. 2 the chain 49 will be pulled in opposite directions toward the center of the car and will thus apply the two sets of brakes with the eight brake-blocks 20 21 22 23 24 25 26 27 simultaneously and with equal force, and as the pull is always from the centers 12 13 of the radial areas the turning of the axles 3 6 makes no difference to the braking effect.

The brakes are applied by turning the central spindle 56 so as to pull, as aforesaid, the chain 49, connecting together the two balancing-beams 47 48, bringing them nearer together, as aforesaid, and the links 45 46, connecting the ends of the balancing-beams 47 48 to the power ends 40 41 of the power-levers 34 35, and thus bringing the two beams 28 29, with their blocks 20 21 22 23 24 25 26 27, nearer together, so as to grip the two wheels 1 2 between them, and thus apply all eight brake-blocks 20 21 22 23 24 25 26 27 to their respective wheels simultaneously.

It will be understood that the brake-gear for the two wheels 4 5 is constructed similarly to that above described for the wheels 1 2 and that these two sets of brake-gear act simultaneously.

What I claim as my invention, and desire to secure by Letters Patent, is—

1. In a four-wheel tram car or truck, of brake mechanism for each pair of wheels consisting of four brake-blocks, two cross-beams suspended from the car-body and carrying said blocks, two power-levers carried by one of said beams, links connecting the other of said beams to said former levers, a balance-beam connected to the longer arm of each power-lever and means for bringing the balance-beams of each pair of brake mechanisms nearer together to apply the brakes and for separating them to release the brakes, substantially as described.

2. In a four-wheel tram car or truck, of brake mechanism for each pair of wheels consisting of four brake-blocks, two cross-beams suspended from the car-body and carrying said blocks, two power-levers carried by one of said beams, links connecting the other of said beams to said former levers, a balance-beam connected to the longer arm of each power-lever and means for bringing the balance-beams of each pair of brake mechanism nearer together to apply the brakes and for separating them to release the brakes, said means consisting of a stationary piece, a pulley at each end thereof, a lever pivoted at its middle to said stationary piece, a roller on said lever on each side of the pivotal point and a chain extending from one balance-beam over the roller on one end of the stationary piece, then over the rollers on the lever to the other roller on the stationary piece to the other balance-beam, substantially as described.

In testimony whereof I have signed my name to this specification in the presence of two subscribing witnesses.

GEORGE JOHN CONATY.

Witnesses:
    CHARLES BOSWORTH KETLEY,
    THOMAS JOHN ROWE.